(12) United States Patent
Kim (10) Patent No.: US 11,150,744 B2
(45) Date of Patent: Oct. 19, 2021

(54) SMART CONTROLLER

(71) Applicant: ITVERS CO., LTD., Seongnam-si (KR)

(72) Inventor: Youn Soo Kim, Seoul (KR)

(73) Assignee: ITVERS CO., LTD.

( * ) Notice: Subject to any disclaimer, the term of this patent is extended or adjusted under 35 U.S.C. 154(b) by 0 days.

(21) Appl. No.: 16/614,796

(22) PCT Filed: May 18, 2018

(86) PCT No.: PCT/KR2018/005696
§ 371 (c)(1),
(2) Date: Nov. 18, 2019

(87) PCT Pub. No.: WO2018/212615
PCT Pub. Date: Nov. 22, 2018

(65) Prior Publication Data
US 2020/0209985 A1 Jul. 2, 2020

(30) Foreign Application Priority Data

May 19, 2017 (KR) .......................... 10-2017-0062034

(51) Int. Cl.
*G06F 3/033* (2013.01)
*G06F 3/038* (2013.01)
(Continued)

(52) U.S. Cl.
CPC .......... *G06F 3/0338* (2013.01); *G06F 3/0383* (2013.01); *G06F 3/0485* (2013.01);
(Continued)

(58) Field of Classification Search
CPC .... G06F 3/0338; G06F 3/038; G06F 3/03543; G06F 3/0231; G06F 3/0236;
(Continued)

(56) References Cited

U.S. PATENT DOCUMENTS

| | | | |
|---|---|---|---|
| 2005/0174327 A1* | 8/2005 | Lee | H04N 21/47 345/158 |
| 2008/0007524 A1* | 1/2008 | Chang | G06F 3/0362 345/163 |

(Continued)

FOREIGN PATENT DOCUMENTS

| | | |
|---|---|---|
| JP | 2015116459 A | 6/2015 |
| JP | 5857246 B2 | 2/2016 |

(Continued)

*Primary Examiner* — Xuemei Zheng
(74) *Attorney, Agent, or Firm* — Renaissance IP Law Group LLP (57) ABSTRACT

The present inventive concept relates to a smart controller which wirelessly communicates with a portable terminal so as to control the portable terminal, the smart controller comprising: a main button unit including a direction button for generating a first signal by being pressed laterally and a selection button, disposed at the central portion one side of the direction button, for generating a second signal by being pressed downward; and an auxiliary button unit including at least one button provided to change an operation mode of the main button unit or perform a particular function of the portable terminal.

18 Claims, 4 Drawing Sheets

(51) Int. Cl.
*G06F 3/0484* (2013.01)
*G06F 3/0485* (2013.01)
*H04B 1/38* (2015.01)
*H04M 1/724* (2021.01)
*G06F 3/0338* (2013.01)
*H04B 1/3827* (2015.01)

(52) U.S. Cl.
CPC ......... *G06F 3/04845* (2013.01); *H04B 1/385* (2013.01); *H04M 1/724* (2021.01); *H04B 2001/3861* (2013.01)

(58) Field of Classification Search
CPC .. G06F 3/0383; G06F 3/0219; G06F 3/03545; G06F 1/1684; G06F 1/169; G06F 1/1632; G06F 1/1656; G06F 1/1669; G06F 1/1698; G06F 3/04845; G06F 3/0485; G06F 3/0486; H04M 1/233; H04M 1/236; H04M 1/724; H04B 1/385; H04B 2001/3861
See application file for complete search history.

(56) References Cited

U.S. PATENT DOCUMENTS

| | | | | |
|---|---|---|---|---|
| 2010/0169824 | A1* | 7/2010 | Sawai | G06F 3/04815 715/784 |
| 2015/0163393 | A1* | 6/2015 | Kim | H04N 5/23206 455/419 |
| 2015/0301614 | A1* | 10/2015 | Kim | H01H 25/002 345/184 |

FOREIGN PATENT DOCUMENTS

| | | |
|---|---|---|
| KR | 20140121132 A | 10/2014 |
| KR | 20140129817 A | 11/2014 |
| KR | 20150059350 A | 6/2015 |
| KR | 101637985 B1 | 7/2016 |

* cited by examiner

SMART CONTROLLER

TECHNICAL FIELD

The present inventive concept relates to a controller and, more particularly, to a smart controller capable of generating an input signal of a mobile terminal, such as a smartphone or a wireless communication device.

BACKGROUND ART

Recently, many portable terminals, such as smartphones, are released.

Meanwhile, liquid crystals having a small size have been applied to a conventional smartphone so that the smartphone can be easily carried and is faithful to its natural function. However, a smartphone having liquid crystals of a large size tends to gradually increase because users recently tend to prefer obtaining more information in a wide screen rather than portability.

However, a visual comfortable sensation of a user can be satisfied due to an increase in the size of a smartphone, but there is a problem in that it is difficult to control the smartphone using one hand.

Furthermore, in the smartphone, most of inputs are performed through a touch screen. If game is performed using the smartphone, an elaborate manipulation is not easy. Furthermore, if a manipulation button displayed on a touch screen is manipulated using a hand, there is a problem in that the manipulation button or hand hides a display.

DISCLOSURE OF INVENTION

Technical Problem

An object of a smart controller according to the present inventive concept is to provide the following solution in order to solve the problem.

There is provided a smart controller configured to enable a user to manipulate a mobile terminal by one hand freely and simply although the mobile terminal includes a display having a large size.

Objects of the present inventive concept are not limited to the above-described objects, and other objects not described above may be evidently understood by a person having ordinary knowledge in the art from the following description.

Technical Solution

A smart controller according to the present inventive concept relates to a smart controller wirelessly communicating with a mobile terminal and controlling the mobile terminal, and includes a main button unit including a direction button a first signal by lateral pressurization and a selection button positioned at a central part or on one side of the direction button to generate a second signal by downward pressurization; and an auxiliary button unit including at least one button provided to change an operation mode of the main button unit or perform a specific function of the mobile terminal.

The auxiliary button unit includes a first button for setting the operation mode of the main button unit as a keyboard mode.

If the operation mode of the main button unit is set as the keyboard mode by a manipulation of the first button, the first signal is a direction switch signal generated based on a pressurization direction of the direction button, and the second signal is a selection or execution signal.

The auxiliary button unit includes a second button for setting the operation mode of the main button unit as a mouse mode.

If the operation mode of the main button unit operates as the mouse mode by a manipulation of the second button, the first signal is a mouse pointing signal generated based on a pressurization direction of the direction button, and the second signal is a selection or execution signal.

If the second button is operated in the state in which the first signal is the mouse pointing signal, the first signal switches from the mouse pointing signal to a scroll signal or a drag signal. The switch into the scroll signal or the drag signal is selectively performed based on an operation retention time or the number of operations of the second button.

The auxiliary button unit includes a third button configured to generate an initial screen return signal or a back signal.

The initial screen return signal and the back signal are selectively generated based on an operation retention time or the number of operations of the third button.

When the direction button is pressed in a first direction, the first signal is a mouse pointing signal in a specific direction. If the pressurization of the direction button in the first direction is maintained for a preset time or more, the first signal switches from the mouse pointing signal of the specific direction to a scroll signal or drag signal toward the specific direction.

If the pressurization direction of the direction button switches from the first direction to a direction opposite the first direction or a direction having an angle of 90 degrees to the first direction in the state in which the scroll signal or drag signal toward the specific direction is generated, the first signal switches from the scroll signal or the drag signal to the mouse pointing signal again.

If the operation mode of the main button unit is the mouse mode, when the direction button is operated by a preset number within a preset time, the first signal switches from a mouse pointing signal to a scroll signal or a drag signal.

If the operation mode of the main button unit is the mouse mode, the first signal switches from a mouse pointing signal to a scroll signal or a drag signal based on an operation of the selection button. The switch into the scroll signal or the drag signal is performed based on an operation retention time or the number of operations of the selection button.

If the selection button is operated in the state in which the first signal is the scroll signal or the drag signal, the scroll signal switches to a mouse pointing signal, and the drag signal switches to a drop signal.

The auxiliary button unit includes a fourth button for executing a specific application installed in the mobile terminal.

A different application is executed based on at least one of an operation retention time or the number of operations of the fourth button.

A first application is executed if an operation of the fourth button is maintained for a preset time or less. A second application is executed if an operation of the fourth button is maintained for more than a preset time. A third application is executed if the fourth button is operated twice within a preset time.

A different control signal is generated as the second signal based on at least one of an operation retention time and the number of operations of the selection button.

An execution signal for a specific application is generated if an operation of the selection button is maintained for more than a preset time.

An initial screen return signal or a back signal is generated if an operation of the selection button is maintained for more than a preset time or the selection button is driven twice or more within a preset time.

Pairing with the mobile terminal is performed if the selection button and any button included in the auxiliary button unit are operated simultaneously.

A direction of the first signal switches to an opposite direction if the selection button and any button included in the auxiliary button unit are operated simultaneously.

The smart controller further includes a first body accommodating the main button unit and the auxiliary button unit; and a second body in which a reception unit for accommodating the first body is formed, wherein a connection part for connecting the second body to the mobile terminal is formed on a bottom or side of the second body.

The reception unit is formed on one side on an upper side of the second body. A support unit configured to support the mobile terminal by allowing a user to insert a finger into the support unit is further provided on the other side of the second body.

The second body includes a vertical unit having one side brought into contact and combined with the mobile terminal and a horizontal unit horizontally extended from the other side of the vertical unit. The reception unit is formed between a bottom of the mobile terminal and the horizontal unit if one side of the second body is brought into contact and combined with the bottom of the mobile terminal. The first body slides into the reception unit and is combined with the second body.

The horizontal unit includes a support unit configured to support the mobile terminal by allowing a user to insert a finger into the support unit.

A magnetic body is positioned at the bottom of the first body.

A first groove or first protrusion for guiding the sliding insertion of the first body is formed on a lower side of the horizontal unit. A second protrusion or second groove corresponding to the first groove or first protrusion is formed on an upper side of the first body.

Advantageous Effects

The smart controller according to the present inventive concept is detachably formed in a mobile terminal, a mobile phone casing or a wireless communication device, but includes the input unit for controlling at least one of the mobile phone or the wireless communication device. Accordingly, there is an effect in that a user's use convenience for a mobile terminal can be increased because the user can control the mobile terminal while supporting the mobile terminal by one hand.

Furthermore, there is an effect in that the mobile terminal casing capable of overcoming a reduction in the production cost and a height limit to a mobile terminal can be provided because the input button is configured to generate various signals based on a combination of the push button and the press button.

Effects of the present inventive concept are not limited to the above-described effects, and other effects not described above may be evidently understood by a person having ordinary knowledge in the art from the following description.

DETAILED DESCRIPTION

Preferred embodiments according to the present inventive concept are described in detail with reference to the accompanying drawings. The same or similar element is assigned the same reference numeral regardless of its reference numeral, and a redundant description thereof is omitted.

Furthermore, in describing the present inventive concept, a detailed description of a related known technology will be omitted if it is deemed to make the gist of the present inventive concept unnecessarily vague. Furthermore, the accompanying drawings are merely intended to make easily understood the spirit of the present inventive concept, and the spirit of the present inventive concept should not be construed as being restricted by the accompanying drawings.

Hereafter, a smart controller according to an embodiment of the present inventive concept is described with reference to FIGS. 1 to 5.

Figure 1:
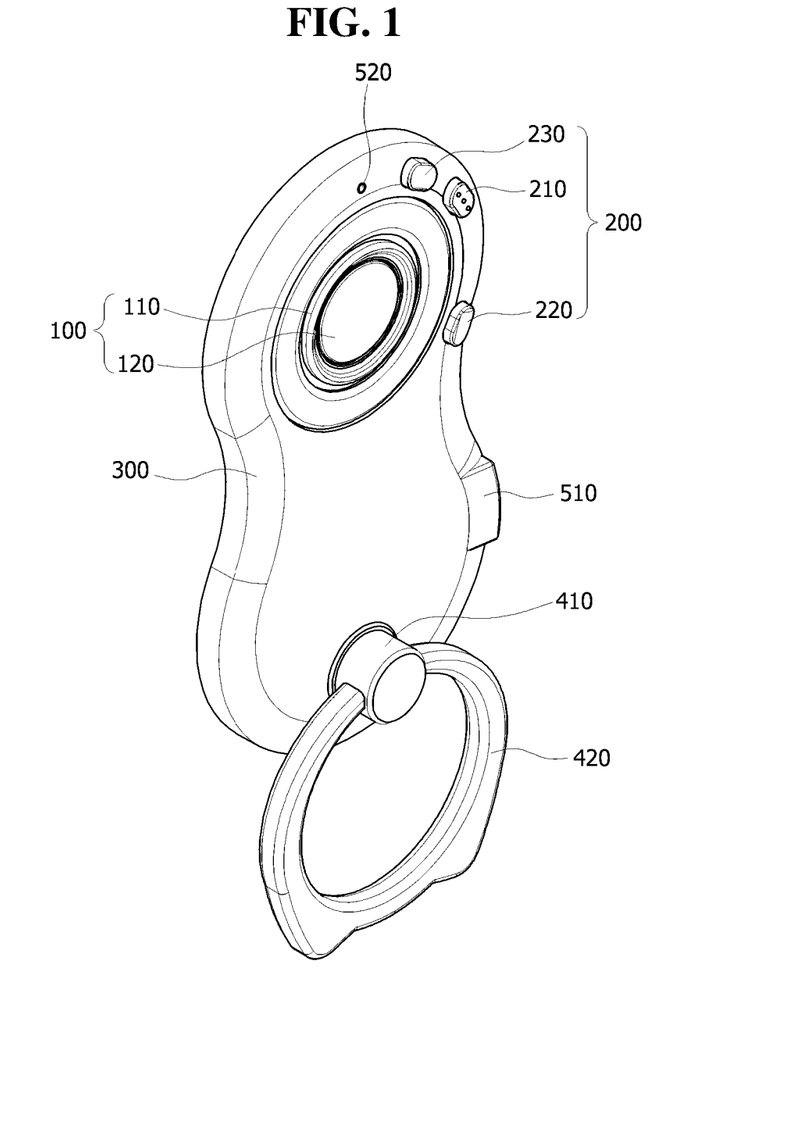
FIG. 1 is a perspective view showing a smart controller according to an embodiment of the present inventive concept.
Figure 2:
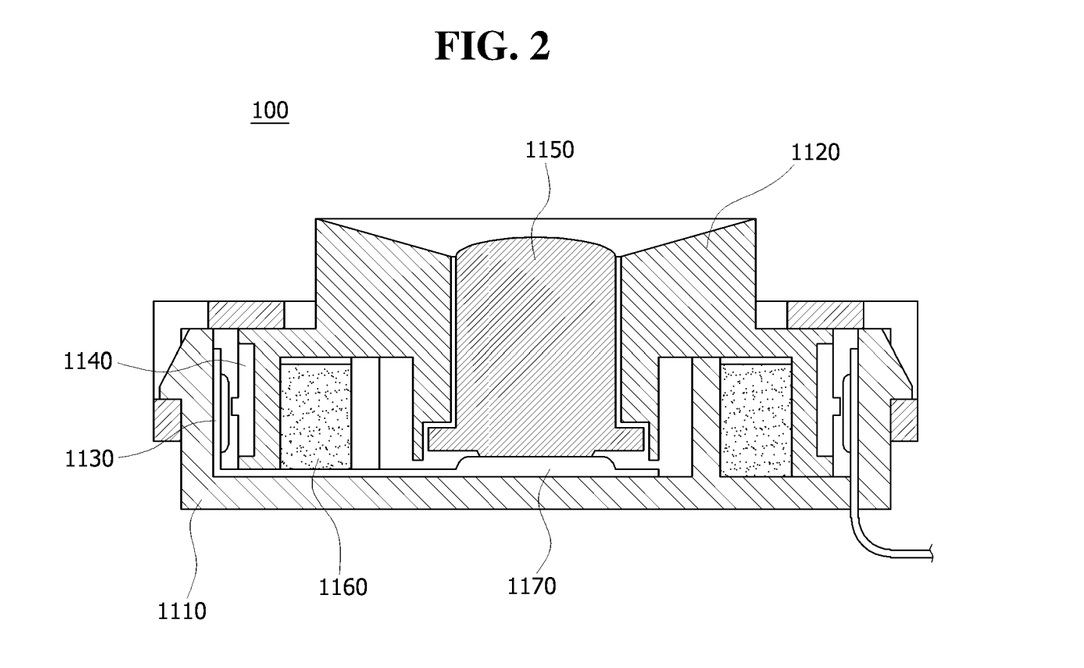
FIGS. 2 and 3 are diagrams showing embodiments of a smart button which may be used as a main button unit in the elements of the smart controller according to an embodiment of the present inventive concept.
Figure 3:
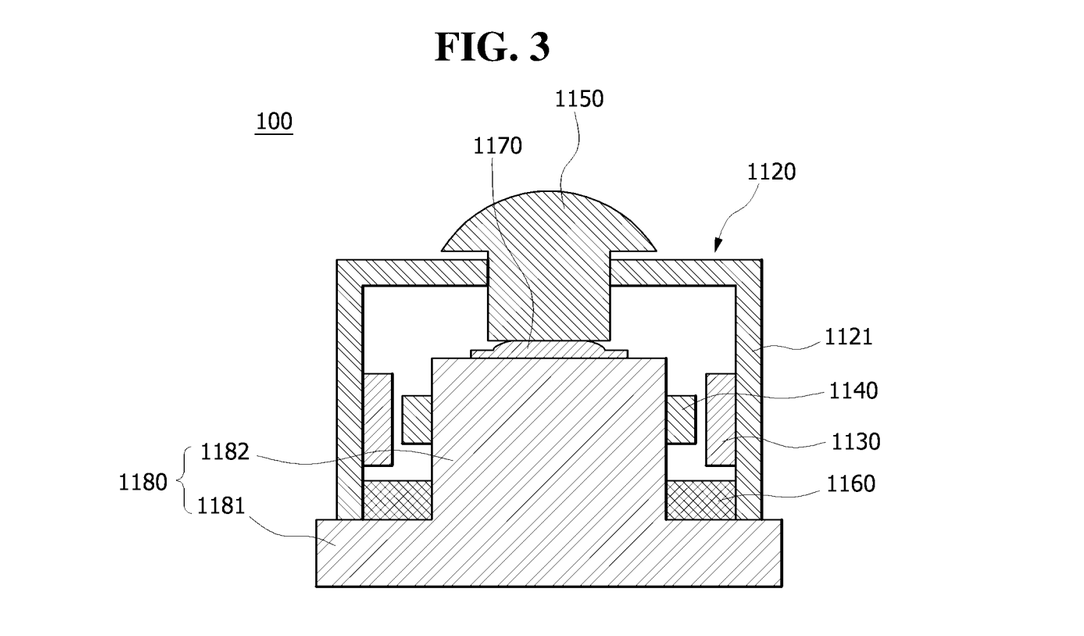
Figure 4:
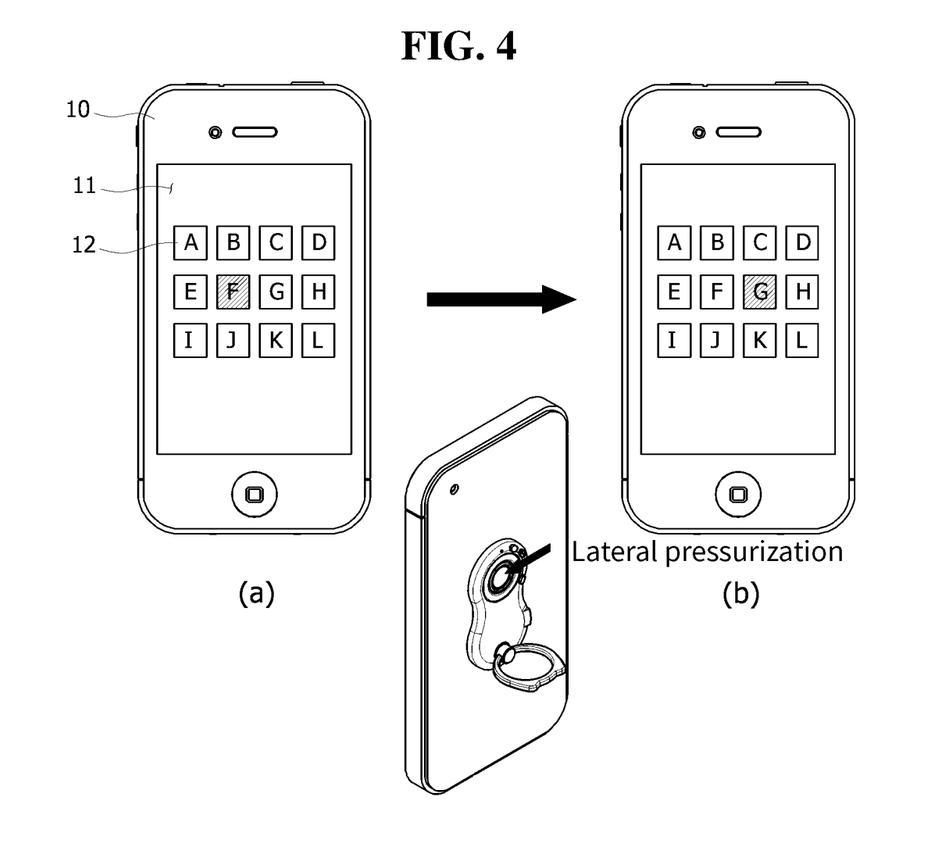
FIG. 4 is a diagram for describing a keyboard mode operation of the smart controller according to an embodiment of the present inventive concept.
Figure 5:
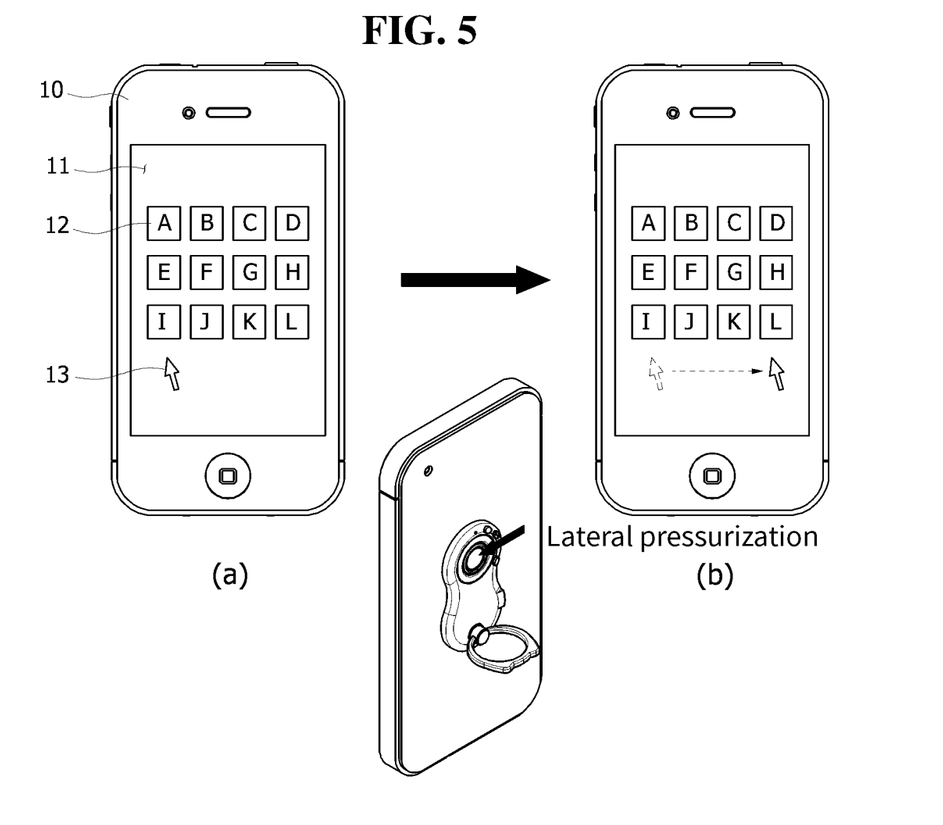
FIG. 5 is a diagram for describing a mouse mode operation of the smart controller according to an embodiment of the present inventive concept.

FIG. 1 is a perspective view showing a smart controller according to an embodiment of the present inventive concept. FIGS. 2 and 3 are diagrams showing embodiments of a smart button which may be used as a main button unit in the elements of the smart controller according to an embodiment of the present inventive concept. FIG. 4 is a diagram for describing a keyboard mode operation of the smart controller according to an embodiment of the present inventive concept. FIG. 5 is a diagram for describing a mouse mode operation of the smart controller according to an embodiment of the present inventive concept.

The smart controller according to an embodiment of the present inventive concept relates to a smart controller controlling a mobile terminal 10 and may control the mobile terminal 10 through wired communication with the mobile terminal 10, but may control the mobile terminal 10 using wireless communication, such as Bluetooth.

As shown in FIG. 1, the smart controller includes a main button unit 100 and auxiliary button unit 200, that is, input units for generating various control signals of the mobile terminal 10 and will be described in detail later.

Furthermore, the smart controller according to an embodiment of the present inventive concept includes a main body 300 for accommodating the main button unit 100 and the auxiliary button unit 200. A connection member for being attached to the mobile terminal 10 or the bottom of a casing that accommodates the mobile terminal 10 may be provided at the bottom of the main body 300.

Particularly, the main body 300 of the smart controller according to an embodiment of the present inventive concept may further include a support unit formed so that a user can support the mobile terminal 10, etc. by inserting his finger, such as an index finger or a middle finger, into the support unit.

The support unit is positioned at the upper part of the main body 300, and may be isolated from the main button unit 100 and the auxiliary button unit 200 by a given distance so that a user can manipulate the main button unit 100 or the auxiliary button unit 200 using an inserted finger in the state in which the finger has been inserted into the support unit.

As shown in FIG. 1, the support unit may be configured to include a connection member 410 positioned at the upper part the main body 300 rotatably up and down and a ring member 420 coupled to the connection member 410 rotatably up and down.

The ring member 420 can rotate around the main body 300 up and down and left and right.

Furthermore, unlike in that shown in FIG. 1, the support unit has one end and the other end coupled to one side and the other side of the main body 300, respectively, but the support unit may be coupled to the main body 300 rotatably up and down.

Moreover, the smart controller according to an embodiment of the present inventive concept may include a battery for supplying power. The battery is a rechargeable battery. The main body 300 may include a connector terminal 510 for charging the battery.

The connector terminal may adopt the same one as the connector terminal of the mobile terminal 10 accommodated or attached by the smart controller in order to improve user convenience.

Furthermore, the smart controller according to an embodiment of the present inventive concept may include an LED 520 by which an operating state of the smart controller can be checked.

The smart controller according to an embodiment of the present inventive concept may be configured with two bodies unlike in FIG. 1.

For example, the smart controller may separately include a first body for accommodating the main button unit 100 and auxiliary button unit 200 for generating control signals of the mobile terminal 10 and a second body to which a connection part capable of being coupled to the mobile terminal 10 and the support unit are attached.

In this case, a reception unit for accommodating the first body is formed in the second body. The second body is detachably configured in the first body, and the first body may be attached to the back of the mobile terminal if necessary in order to control the mobile terminal 10. Alternatively, the first body may be separated from the second body to remotely control the mobile terminal 10.

Furthermore, the second body may be configured in a "¬"-shaped form, and the first body may slide into a reception unit formed between the second body and the bottom of the mobile terminal 10 so that the first body and the second body are coupled.

Specifically, the second body includes a vertical unit having one side brought into contact and combined with the mobile terminal 10 and a horizontal unit horizontally extended from the other side of the vertical unit.

An adhesion part for coming in contact with the mobile terminal 10 is formed on one side of the second body. When one side of the second body is brought into contact and combined with the bottom of the mobile terminal 10, the reception unit is formed between the bottom of the mobile terminal 10 and the horizontal unit.

In this case, the first body may slide into the reception unit and may be combined with the second body.

Particularly, the horizontal unit includes a support unit which enables a user to support the mobile terminal by inserting a finger into the support unit. For example, the connection member 410 may be formed on the upper side of the horizontal unit in such a way as to be rotated with respect to the horizontal unit. The ring member 42 may be coupled to the connection member 410 rotatably up and down.

Meanwhile, if the first body has slid into the reception unit of the second body, a user can easily manipulate the main button unit and the auxiliary button unit because the first body does not move.

To this end, the first body may be firmly fixed to the mobile terminal 10 by positioning a magnetic body at the bottom of the first body.

Furthermore, a first groove or first protrusion for guiding the sliding insertion of the first body may be formed on the lower side of the horizontal unit of the second body. A second protrusion or second groove corresponding to the first groove or first protrusion may be provided on the upper side of the first body. Accordingly, the first body can be accurately inserted into the second body, and the first body and the second body can be firmly combined.

Hereafter, the main button unit 100 and the auxiliary button unit 200 are described more specifically.

As shown in FIG. 1, the main button unit 100 basically includes a direction button 110 and a selection button 120.

The direction button 110 functions to generate a first signal related to a direction by lateral pressurization. The selection button 120 is positioned at the central part or on one side of the direction button 110 and functions to generate a second signal by downward pressurization.

Meanwhile, smart buttons shown in FIGS. 2 and 3 may be applied to the main button unit 100. The structure and function of the main button unit 100 may be implemented through the smart buttons.

First, an example of the main button unit 100 applied to the smart controller according to the present inventive concept is described with reference to FIG. 2.

The main button unit 100 applied to the smart controller according to the present inventive concept basically includes a housing 1110, a push button 1120, a sensor 1130 and a contact point 1140.

The housing 1110 is configured to have an inside space whose top open.

The push button 1120 is seated in the inside space provided in the housing 1100, and is not fixed in the state in which the push button has been seated in the inside space, but is configured to move at a given distance laterally, such as front and back or left and right.

The sensor 1130 is an element provided on any one side of the external surface of the push button 1120 or the internal surface of the housing 1110. The contact point 1130 is an element provided on the other side of the external surface of the push button 1120 or the internal surface of the housing 1110.

Specifically, the sensor 1130 may be configured with a flexible printed circuit board including two or more terminal switches. In this case, the terminal switches function as the sensor 1130.

The contact point 1130 may be configured with a conductor. As a result, when the push button 1120 is pushed laterally, the contact point 1130 comes into contact with the sensor 1130 positioned in the direction in which the push button 1200 is moved, thereby generating an input signal assigned to the contacted sensor 1130.

When the button is laterally pushed and pressed as described above, a push type input button from which an input signal is generated has already been proposed in various structures. A conventional push type input button essentially requires a pressurization sensor for detecting lateral pressurization and has a disadvantage in that the production cost of a signal input device is inevitably very high.

Particularly, if the button is configured to generate a different type of input signal depending on the direction in which the button is pushed, there is a disadvantage in that a production cost problem, such as that described above, is further great because each pressurization sensor must be positioned in each direction in which pressure is applied.

In contrast, according to an example of the main button unit 100 applied to the smart controller according to the present inventive concept, there is an advantage in that a different type of input signal can be generated in a corresponding direction when pressure is laterally applied even without a separate pressurization sensor for each direction.

Meanwhile, after the contact point 1140 comes into contact with any one sensor 1130 as the push button 1120 is pushed and moved to any one side, if the sensor 1130 continues to come into contact with the sensor 1130 when pressure applied to the push button 1120 is released, an input signal may continue to be generated contrary to a user's intention.

In order to such a problem, an elastic member 1160 for returning the location of the push button 1120 so that the sensor 1130 and the contact point 1140 are separated when the push button 1120 is laterally moved may be further provided.

If the elastic member 1160 is provided as described above, when a lateral external force applied to the push button 1120 is released, the push button 1120 returns to its initial location by the elastic force of the elastic member 1160. Accordingly, the sensor 1130 and the contact point 1130 have an isolated state, that is, the state in which any input signal is not generated.

Furthermore, as shown in FIG. 2, an example of the main button unit 100 applied to the smart controller according to the present inventive concept may further include a switch 1170 positioned at the bottom of the housing and a press button 1150 positioned on the upper side of the push button 1120.

The press button 1150 upward penetrates the push button 1120 and is exposed to the outside, and has the bottom seated in the switch 1170. Accordingly, when a downward pressurization force is applied to the press button 1150, the press button 1150 is downward pushed to press the switch 1170, thus generating a signal different from a signal generated by a movement of the push button 1120.

Accordingly, various signals can be generated based on an operation combination of the push button 1120 and the press button 1150. In this case, the push button 1120 and the press button 1150 may be said to correspond to the direction button 110 and the selection button 120, respectively, in the smart controller according to an embodiment of the present inventive concept.

Hereafter, another example of the main button unit 100 applied to the smart controller according to the present inventive concept is described with reference to FIG. 3.

The main button unit 100 applied to the smart controller according to the present inventive concept may be configured to basically include a base member 1180, a push button 1120, a sensor unit 1130 and a contact point 1140.

The base member 1180 includes a bottom surface 1181 and a protruded unit 1182 upward protruded from the central part of the bottom surface 1181.

The push button 1120 is positioned over the protruded unit 1182. A downward sidewall 1121 downward formed from the push button 1120 to surround the outside of the protruded unit 1182 is formed in the push button 1120.

Furthermore, as shown in FIG. 3, the sensor unit 1130 is provided on the outside of the protruded unit 1182. The contact point 1140 may be provided in an area that belongs to the outside of the protruded unit 1182 and that corresponds to a portion where the sensor unit 1130 is positioned on the inside of the downward sidewall 1121.

In contrast, the sensor unit 1130 may be provided on the inside of the downward sidewall 1121. The contact point 1140 may be provided in an area that belongs to the inside of the downward sidewall 1121 and that corresponds to a portion where the sensor unit 1130 is positioned on the outside of the protruded unit 1182.

In such a structure, when the push button 1120 is laterally moved, the sensor 1130 and the contact point 1400 come into contact with each other, thus generating a signal. Specifically, the push button 1120 is configured to move at a given distance laterally, such as front and back or left and right, not up and down. When a user laterally pushes the push button 1120, the contact point 1140 comes into contact with the sensor unit 1130 positioned in the direction in which the push button 1120 moves. Accordingly, an input signal related to a correspond one of a plurality of sensors disposed within the sensor unit 1130 is generated.

Accordingly, the push button 1120 needs to be configured to move only front and back or left and right without rotating. The reason for this is that if the push button 1120 rotates, a sensor required by a user and the contact point may not come into contact with each other and thus an unwanted input signal may be generated.

Meanwhile, a touch sensor or a tactile sensor may be used as the sensor unit 1130. The sensor unit 1130 may be configured with a flexible circuit board when considering a reduction in the manufacturing production cost and the weight of a product.

That is, at least one sensor is positioned in the flexible circuit board. The sensor is configured with a terminal switch including a positive terminal and a negative terminal, and the contact point 1140 is configured with a conductor. Accordingly, when the push button 1120 moves laterally, both the positive terminal and negative terminal of the terminal switch come into contact with the contact point 1140 so that the positive terminal and the negative terminal are short-circuited. Accordingly, an input signal is generated.

Specifically, the positive terminal and negative terminal of the terminal switch may be isolated and disposed in parallel. Furthermore, the terminal switch is configured with a positive terminal and a negative terminal so that they have portions alternately arranged in a horizontal direction, that is, so that they have a concavo-convex pattern up and down and concavo-convex portions are crossed and engaged with each other. The positive terminal and the negative terminal may be configured to have their concavo-convex portions crossed and engaged with each other, but to maintain a fine isolated state therebetween.

Furthermore, in the case of the contact point 1140, only a contact portion may be configured to be protruded for a firm short circuit between the positive terminal and the negative terminal.

Furthermore, an elastic member 1160 for returning the push button 1120 to its original location after it laterally moves may be further provided. An elastic material, such as carbon sponge or silicon for applying a restoring elastic force to the push button 1120 when the push button 1120 laterally moves may be applied as the elastic member 1160.

Through such a structure, various signals can be generated based on an operation combination of the push button 1120 and the press button 1150. In this case, the push button 1120 and the press button 1150 may be said to correspond to the direction button 110 and the selection button 120, respectively, in the smart controller according to an embodiment of the present inventive concept.

The smart controller according to an embodiment of the present inventive concept includes the auxiliary button unit 200 configured separately from the main button unit 100. The auxiliary button unit 200 includes at least one button provided to change an operation mode of the main button unit 100 or perform a specific function of the mobile terminal 10.

The auxiliary button unit 200 may include a first button 210 and second button 220 for determining an operation mode of the main button unit 100.

The first button 210 functions to set an operation mode of the main button unit 100 as a keyboard mode. If a user presses the first button 210 and thus the main button unit 100 operates in the keyboard mode, the direction button 110 of the main button unit 100 becomes the direction button of a keyboard and the selection button 120 becomes an Enter button.

Specifically, when a user presses the first button 210, a selection mark appears in an icon F, that is, one of a plurality of application icons arranged on the display 11 of the mobile terminal 10 as in FIG. 4(*a*).

At this time, when the user presses the selection button 120, an application corresponding to the icon F is executed. When the user presses the direction button 110 not the selection button 120 in any one direction, the selected icon is changed in the pressurization direction or a direction opposite the pressurization direction.

For example, in the state in which the selection mark is positioned in the icon F as in FIG. 4(*a*), when a user laterally presses the direction button 110, a first signal, that is, a direction signal generated by the lateral pressurization, is generated. Accordingly, the selection mark moves from the icon F to an icon G.

At this time, when the user presses the selection button 120, an application corresponding to the icon G is executed.

That is, if an operation mode of the main button unit 100 is set as the keyboard mode by a manipulation of the first button 210, a first signal is a direction switch signal generated based on the pressurization direction of the direction button 110, and a second signal is a selection signal or an execution signal.

Furthermore, the auxiliary button unit 200 may include the second button 220 for setting an operation mode of the main button unit 100 as a mouse mode.

If an operation mode of the main button unit 100 operates as the mouse mode by a manipulation of the second button 220, a first signal is a mouse pointing signal generated based on the pressurization direction of the direction button 110, and a second signal is a selection or execution (click) signal.

Specifically, when a user presses the second button 220, a mouse pointer 13 is indicated on the display 11 of the mobile terminal 10 as in FIG. 5(*a*).

At this time, when the user laterally presses the direction button 110, the mouse pointer 13 is moved in the direction in which the direction button is pressed or a direction opposite the direction in which the direction button is pressed as in FIG. 5(*b*).

When the user presses the selection button 120 after moving the mouse pointer 13 to any one icon displayed on the display 11 of the mobile terminal 10 using the direction button 110, an application corresponding to the corresponding icon is executed.

Meanwhile, a common mouse can perform a scroll function using a wheel or can perform a drag/drop function using a process of releasing an operation of a button after moving the mouse in the state in which the button of the mouse operates, in addition to the above-described mouse point function and click function. The smart controller according to an embodiment of the present inventive concept can also perform the scroll function and the drag/drop function through a simple manipulation. This is described below.

As described above, when a user manipulates the second button 220 and thus an operation mode of the main button unit 100 operates as the mouse mode, a mouse pointing signal, that is, a motion signal of the mouse pointer displayed on the display 11 of the mobile terminal 10, is generated as the first signal generated by the direction button 110.

In such a state, the first signal generated by the direction button 110 may be switched from the mouse pointing signal to the scroll signal or the drag signal by a simple manipulation of the user, and several embodiments thereof are described below.

First, as a first embodiment, if a user operates the second button 220, a first signal may switch from a mouse pointing signal to a scroll signal or a drag signal. The switch from the mouse pointing signal to the scroll signal or the drag signal may be selectively performed based on the operation retention time or the number of operations of the second button 220.

For example, if a user presses the second button 220 for more than a preset time, a first signal may switch from a mouse pointing signal to a scroll signal. If a corresponding operation is released within the preset time, the first signal may switch from the mouse pointing signal to the drag signal, and opposite setting thereof is also possible.

Furthermore, if a user presses the second button 220 once, a first signal may switch from a mouse pointing signal to a scroll signal. If a user consecutively presses the second button 220 twice like a double click within a preset time, the first signal may switch from the mouse pointing signal to a drag signal, and opposite setting thereof is also possible.

As a second embodiment, to change a first signal from a mouse pointing signal to a scroll signal or a drag signal based on an operation of the selection button 120 of the main button unit 100 may be considered. The switch from the mouse pointing signal to the scroll signal or the drag signal may be selectively performed based on the operation retention time or the number of operations of the selection button 120.

For example, if a user presses the selection button 120 for more than a preset time, a first signal may switch from a mouse pointing signal to a scroll signal. If a corresponding operation is released within the preset time, the first signal may switch from the mouse pointing signal to the drag signal, and opposite setting thereof is also possible.

Furthermore, if a user consecutively presses the selection button 120 twice within a preset time, a first signal may switch from a mouse pointing signal to a scroll signal. If a user consecutively presses the selection button 120 three times within a preset time, a first signal may switch from a mouse pointing signal to a drag signal, and opposite setting thereof is also possible.

As a third embodiment, to change a first signal from a mouse pointing signal to a scroll signal or a drag signal based on the pressurization time of the direction button 110 may be considered.

Specifically, if the direction button 110 is pressed in a first direction, as described above, a first signal is a mouse pointing signal in the first direction or a direction opposite the first direction. If such pressurization in the first direction is maintained for more than a preset time, the first signal may switch from a mouse pointing signal having a specific direction to a scroll signal or drag signal toward the specific direction.

Particularly, the third embodiment may be usefully used when a user views a webpage lengthily configured in a longitudinal direction, such as Webtoon, through the mobile terminal 10.

For example, if a user views a webpage through the mobile terminal 10, when the user downward presses the direction button 110, a mouse pointing signal, that is, a first signal, is generated, so the mouse pointer downward moves within the display 11 of the mobile terminal 10.

In this state, if the downward pressurization of the direction button 110 is maintained for more than a preset time, the first signal switches from the mouse pointing signal having a downward direction to a scroll signal having a downward direction. Accordingly, the webpage is automatically scrolled downward.

In this case, in order to prevent a problem in that a user may not find the location of the mouse pointer because the mouse pointer is positioned at the bottom in the downward direction within the display 10, it may be preferred to periodically generate a mouse point signal from a user convenience aspect so that the mouse pointer periodically moves to the middle part of the display 10.

In the state in which a first signal, that is, a mouse pointing signal, has switched from a scroll signal or a drag signal according to the first embodiment to the third embodiment, the generation of the scroll signal or the drag signal may need to be released.

To this end, if the selection button 120 is operated in the state in which a first signal is a scroll signal or a drag signal, the scroll signal may switch to a mouse pointing signal and the drag signal may switch to a drop signal.

Moreover, in the case of the third embodiment, the generation of a scroll signal or a drag signal may be released by a manipulation of the direction button 110.

Specifically, in the state in which the pressurization of the direction button 110 in a first direction is maintained for a preset time or more and thus a scroll signal or drag signal toward a specific direction is generated, if a user manipulates the direction button 110, but presses the direction button 110 in a direction opposite the first direction or in a direction having an angle of 90 degrees to the first direction, a first signal may switch from the scroll signal or the drag signal to a mouse pointing signal again.

The auxiliary button unit 200 of the smart controller according to an embodiment of the present inventive concept may include a third button 230 for generating an initial screen (home screen) return signal or a back signal.

Particularly, both an initial screen return signal and a back signal may be generated by only the one third button 230. Specifically, the third button 230 may be configured to selectively generate an initial screen return signal and a back signal based on the operation retention time or the number of operations of the third button 230.

For example, the third button 230 may be configured to generate an initial screen return signal if a user presses the third button 230 for more than a preset time. The third button 230 may be configured to generate a back signal if a corresponding operation is released within the preset time, and opposite setting thereof is also possible.

Furthermore, the third button 230 may be configured to generate an initial screen return signal if a user presses the third button 230 once. The third button 230 may be configured to generate a back signal if a user consecutively presses the third button 230 twice like a double click within a preset time, and opposite setting thereof is also possible.

The auxiliary button unit 200 of the smart controller according to an embodiment of the present inventive concept may include a fourth button for executing a specific application installed in the mobile terminal 10.

Particularly, in order to execute a plurality of specific applications by only the one fourth button, different applications may be executed based on at least one of the operation retention time or the number of operations of the fourth button.

For example, the fourth button may be configured to execute a first application if an operation of the fourth button is maintained for a preset time or less. The fourth button may be configured to execute a second application if an operation of the fourth button is maintained for more than a preset time. The fourth button may be configured to execute a third application if it is operated twice within a preset time.

The selection button 120 included in the main button unit 100 of the smart controller according to an embodiment of the present inventive concept has been illustrated as generating a selection/execution signal. However, the selection button 120 may be configured to generate a different control signal based on at least one of an operation retention time and the number of operations.

Specifically, the selection button 120 may be configured to generate an execution signal of a specific application if an operation of the selection button 120 is maintained for more than a preset time. Accordingly, the selection button 120 executes a function of the fourth button.

Furthermore, the selection button 120 may be configured to generate an initial screen return signal or a back signal if an operation of the selection button 120 is maintained for more than a preset time or if the selection button 120 is operated twice or more within a preset time. Accordingly, the selection button 120 can perform a function of the third button.

Moreover, the smart controller according to an embodiment of the present inventive concept may generate various signals by driving at least two of several buttons included in the main button unit 100 and the auxiliary button unit 200 at the same time.

Specifically, pairing between the smart controller and the mobile terminal may be performed by driving the selection button 120 and any button included in the auxiliary button unit 200 at the same time.

Furthermore, the direction of a first signal generated by the direction button 110 may switch to an opposite direction by driving the selection button 120 and any button included in the auxiliary button unit 200 at the same time.

As in FIGS. 4 and 5, the situation in which the smart controller is manipulated in the state in which the direction button 120 of the smart controller has been mounted on the back of the mobile terminal 10 and placed in a direction opposite the display 11 and the situation in which the smart controller is manipulated in the state in which after the smart controller is separated from the mobile terminal, the direction button 110 has been placed in the same direction as the display of the mobile terminal 11 may occur.

The left/right pressurization direction of the direction button 110 and the left/right movement direction of the mouse pointer need to be set in the same direction or opposite directions depending on such two situations. The left/right pressurization directions may be set by driving the selection button 120 and any button included in the auxiliary button unit 200 at the same time.

Although the present inventive concept has been described in detail using the preferred embodiments, the scope of the present inventive concept is not limited to the specific embodiments and should be interpreted based on the claims. Furthermore, a person having ordinal knowledge in the art should understand that the present inventive concept may be modified and changed in many ways without departing from the scope of the present inventive concept.

The invention claimed is:

1. A smart controller wirelessly communicating with a mobile terminal and controlling the mobile terminal, the smart controller comprising:
    a main button unit comprising a direction button provided to generate a first signal by lateral pressurization and a selection button positioned at a central part or on one side of the direction button to generate a second signal by downward pressurization; and
    an auxiliary button unit comprising at least one button provided to change an operation mode of the main button unit;
    wherein the auxiliary button unit comprises a second button for setting the operation mode of the main button unit as a mouse mode,
    wherein if the operation mode of the main button unit operates as the mouse mode by a manipulation of the second button, the first signal is a mouse pointing signal generated based on a pressurization direction of the direction button, and the second signal is a selection or execution signal;
    wherein:
    if the second button is operated in the state in which the first signal is the mouse pointing signal, the first signal switches from the mouse pointing signal to a scroll signal or a drag signal, and
    the switch into the scroll signal or the drag signal is selectively performed based on an operation retention time or a number of operations of the second button.

2. The smart controller of claim 1, wherein the auxiliary button unit comprises a first button for setting the operation mode of the main button unit as a keyboard mode,
    wherein if the operation mode of the main button unit is set as the keyboard mode by a manipulation of the first button, the first signal is a direction switch signal generated based on a pressurization direction of the direction button, and the second signal is a selection or execution signal.

3. The smart controller of claim 1, wherein a different control signal is generated based on at least one of an operation retention time and a number of operations of the selection button.

4. The smart controller of claim 3, wherein an execution signal for a specific application is generated if an operation of the selection button is maintained for more than a preset time.

5. The smart controller of claim 4,
    wherein the auxiliary button unit comprises a second button for setting the operation mode of the main button unit as a mouse mode,
    wherein when the direction button is pressed in a first direction, the first signal is a mouse pointing signal in a specific direction, and
    if the pressurization of the direction button in the first direction is maintained for a preset time or more, the first signal switches from the mouse pointing signal of the specific direction to a scroll signal or drag signal toward the specific direction.

6. The smart controller of claim 5, wherein if the pressurization direction of the direction button switches from the first direction to a direction opposite the first direction or a direction having an angle of 90 degrees to the first direction in the state in which the scroll signal or drag signal toward the specific direction is generated, the first signal switches from the scroll signal or the drag signal to the mouse pointing signal again.

7. The smart controller of claim 4,
    wherein the auxiliary button unit comprises a second button for setting the operation mode of the main button unit as a mouse mode,
    wherein if the operation mode of the main button unit is the mouse mode, when the direction button is operated by a preset number within a preset time, the first signal switches from a mouse pointing signal to a scroll signal or a drag signal.

8. The smart controller of claim 4,
    wherein the auxiliary button unit comprises a second button for setting the operation mode of the main button unit as a mouse mode,
    wherein if the operation mode of the main button unit is the mouse mode, the first signal switches from a mouse pointing signal to a scroll signal or a drag signal based on an operation of the selection button, and
    the switch into the scroll signal or the drag signal is performed based on an operation retention time or a number of operations of the selection button.

9. The smart controller of claim 3, wherein an initial screen return signal or a back signal is generated if an operation of the selection button is maintained for more than a preset time or the selection button is driven twice or more within a preset time.

10. The smart controller of claim 1, wherein pairing with the mobile terminal is performed if the selection button and any button included in the auxiliary button unit are operated simultaneously.

11. The smart controller of claim 1, wherein the first signal corresponds to a pressurization direction of the direction button and wherein a direction represented by the first signal is opposite the pressurization direction if the selection button and any button included in the auxiliary button unit are operated simultaneously.

12. The smart controller of claim 1, wherein the auxiliary button unit further comprises at least one button provided to perform a specific function of the mobile terminal.

13. The smart controller of claim 12, wherein the auxiliary button unit comprises a third button configured to generate an initial screen return signal or a back signal,
    wherein the initial screen return signal and the back signal are selectively generated based on an operation retention time or a number of operations of the third button.

14. The smart controller of claim 12, wherein the auxiliary button unit comprises a fourth button for executing a specific application installed in the mobile terminal.

15. The smart controller of claim 14, wherein a different application is executed based on at least one of an operation retention time or a number of operations of the fourth button.

16. The smart controller of claim 15, wherein:

a first application is executed if an operation of the fourth button is maintained for a preset time or less, a second application is executed if an operation of the fourth button is maintained for more than a preset time, and a third application is executed if the fourth button is operated twice within a preset time.

17. A smart controller wirelessly communicating with a mobile terminal and controlling the mobile terminal, the smart controller comprising:

a main button unit comprising a direction button provided to generate a first signal by lateral pressurization and a selection button positioned at a central part or on one side of the direction button to generate a second signal by downward pressurization;

an auxiliary button unit comprising at least one button provided to change an operation mode of the main button unit or perform a specific function of the mobile terminal;

a first body accommodating the main button unit and the auxiliary button unit; and     a second body in which a reception unit for accommodating the first body is formed, wherein a connection part for connecting the second body to the mobile terminal is formed on a bottom or side of the second body, wherein the reception unit is formed on one side on an upper side of the second body, and wherein a support unit configured to support the mobile terminal by allowing a user to insert a finger into the support unit is further provided on the other side of the second body.

18. The smart controller of claim 17, wherein a magnetic body is positioned at a bottom of the first body.

\* \* \* \* \*